United States Patent [19]

Skovhage et al.

[11] Patent Number: 4,976,981
[45] Date of Patent: Dec. 11, 1990

[54] METHOD FOR PREPARING PREPRESSED CHEESE CURD BLOCKS AND AN ASSEMBLY FOR CARRYING OUT SAID METHOD

[75] Inventors: Erik Skovhage, Vejle; Eskil B. Jorgensen, Silkeborg; Per G. Nielsen, Silkeborg; Christian B. Sorensen, Silkeborg, all of Denmark

[73] Assignee: APV Pasilac A/S, Denmark

[21] Appl. No.: 435,406

[22] PCT Filed: May 13, 1988

[86] PCT No.: PCT/DK88/00078

§ 371 Date: Nov. 9, 1989

§ 102(e) Date: Nov. 9, 1989

[87] PCT Pub. No.: WO88/09118

PCT Pub. Date: Dec. 1, 1988

[30] Foreign Application Priority Data

May 18, 1987 [DK] Denmark ............................ 2508/87

[51] Int. Cl.$^5$ ...................... A01J 25/00; A23C 19/00
[52] U.S. Cl. ...................................... 426/512; 99/456; 99/460; 99/465; 426/582
[58] Field of Search ............... 426/478, 495, 512, 582; 99/454, 456, 458, 459, 460, 465

[56] References Cited

U.S. PATENT DOCUMENTS

| 3,559,287 | 2/1971 | Bronkhorst | 99/458 |
| 3,695,893 | 10/1972 | Czulak et al. | 99/458 |
| 4,217,818 | 8/1980 | Hazen | 99/458 |
| 4,300,445 | 11/1981 | Hazen | 99/458 |
| 4,393,759 | 7/1983 | Quilliou | 99/456 |

FOREIGN PATENT DOCUMENTS

| 5022/85 | 10/1985 | Denmark . |
| 2827257 | 1/1980 | Fed. Rep. of Germany . |
| 2064292 | 6/1981 | United Kingdom . |

OTHER PUBLICATIONS

Derwent Abstract No. 83-831312/48

Primary Examiner—George Yeung
Attorney, Agent, or Firm—Lowe, Price, LeBlanc, Becker & Shur

[57] ABSTRACT

A method for the preparation of prepressed cheese curd blocks (38), where a curd (2) comprising a mixture of curd grains (42) and whey is fed to a conveyor belt (19) and the curd grains (42) are collected and shaped during continuous movement of the belt by being subjected to prepressing means (27) and side-limiting walls (18). The resulting cheese body (30) is cut into suitably dimensioned blocks at a cutting station (37). The curd (2) is fed to the continuously moving conveyor belt (19) below the surface (40) of a whey pool (39) and during the movement of the conveyor belt (19) said curd is conveyed along an oblique path above the surface (40) of the whey pool (39) simultaneous with it being subjected to prepressing means (27). The whey pool is contained in an obliquely installed vat (7), the conveyor belt (19) being introduced at the bottom end of said vat and leaving it at its top end (20). Said top end (20) has no end wall, thus providing space for the cut blocks (38) to pass out of the vat (7) just before the top end (20).

11 Claims, 2 Drawing Sheets

METHOD FOR PREPARING PREPRESSED CHEESE CURD BLOCKS AND AN ASSEMBLY FOR CARRYING OUT SAID METHOD

TECHNICAL FIELD

The present invention relates to a method for preparing prepressed cheese curd blocks, where a curd comprising a mixture of curd grains and whey is fed to a conveyor belt and the curd grains are collected and shaped during continuous movement of the belt by being subjected to prepressing means and side-limiting walls, whereupon the resulting cheese body is cut into suitably dimensioned blocks at a cutting station.

BACKGROUND ART

During the preparation of cheese types, such as Edam, Jarlsberg and Danbo (all registered trademarks), the prepressing part of the process is decisive for the characteristic texture of the cheese. The above cheese types are compact having uniform, circular fermentation holes caused by carbon dioxide formed during the ripening. Originally the prepressing was performed at the bottom of the cheese vat, in which the curd had been prepared. Subsequent to the final stirring the cheese grains were dragged up to one end of the cheese vat by means of a perforated plate or wall. Thus the cheese grains were separated from the main part of the free-flowing whey. The small, preferably rectangular area holding the cheese grains was then covered by a heavy press screen. At the same time the draining of the whey was started from the opposite end of the vat. The pressure on the resulting cheese block was gradually increased by means of weights evenly distributed on the press screen. After 10-30 min the press screen was removed and the drained cheese block was cut into suitable pieces, which were then conveyed to the next part of the process: forming and final pressing.

This known method is only suitable for the cheese making from small portions of cheese milk (up to approx. 6,000 l). Otherwise the area of the cheese blocks is so large that the free-flowing whey cannot escape during prepressing. This results in texture defects in form of small irregular holes under the rind in the finished cheeses due to the presence of whey with a high concentration of lactose causing fermentation along the rim of the cheese block.

When large cheese vats and closed cheese tanks were introduced prepressing in the vat became impossible and special prepressing vats with perforated plates above the bottom and fixed walls were introduced instead. Subsequent to the final stirring in the cheese vat or tank the whey-and-cheese grain mixture was pumped or dumped into a prepressing vat. During this step air is automatically entrapped in the whey, said air being difficult to remove before the beginning of the prepressing. The air is likely to cause fat oxidation and defects in the cheese. Moreover, air bubbles are retained under or in the perforated bottom plate, said bubbles gradually meandering into the cheese during prepressing.

Since then continuously operating assemblies have been developed, where the cheese is prepressed in columns by means of the weight of its grains; the free-flowing whey is continuously drained off in perforated zones. The problem of entrapped air does, however, still exist, as the comparatively high columns of whey and cheese grain do not offer sufficient escape possibilities.

The Danish patent application 5022/85 discloses a method for the preparation of curd blocks for the preparation of cheeses by removing the whey from the curd. In this method the curd is fed to a draining belt, whereon the resulting curd body is subjected to stepwise forward movement while the whey is removed. The curd is fed to the draining belt via an antechamber the bottom of which is formed by the draining belt. This antechamber is separated from the following part by means of a partition forming a small gap opposite the draining belt. As a result the curd is fed to the draining belt under overpressure initiating the separation of the whey. After having passed the partition the curd or cheese body formed by the cheese grains expands. While still being conveyed by the draining belt the curd body is subjected to prepressing means giving it the desired thickness. Simultaneously the desired width is determined by adjustable side walls. Then the cheese body is cut into blocks of predetermined size.

DISCLOSURE OF THE INVENTION

The inventive method is characterised in that the curd is fed to the continuously moving conveyor belt below the surface of a whey pool and during the movement of the conveyor belt said curd is conveyed along an oblique path above the surface of the whey pool simultaneous with it being subjected to prepressing means.

This results in a continuously operating prepressing method, whereby a product is obtained at a comparatively large capacity, said product having the desired texture without defects. This is especially due to the fact that the cheese grains are allowed to collect without being disturbed while they are in the whey, thus enhancing the fusing process. Furthermore, the whey is gradually pressed out by means of prepressing means in accordance with originally used prepressing methods in a cheese vat. Without the desired fusing process the resulting cheese easily obtains a Havarti-like texture, where the grains are still visible.

The curd is preferably fed to the conveyor belt at such a slow velocity that the cheese grains are deposited below the surface of the whey pool with no further influence than the force of gravity and the movement of the whey.

The invention relates furthermore to an assembly for carrying out the method as claimed in claim 1, said assembly including a pump, wherefrom the curd is fed to an endless conveyor belt via an inlet pipe, said conveyor belt running along a support plate and extending from the delivery mouth of the inlet pipe to a cutting station for cutting off cheese blocks of a predetermined size from a cheese body resulting from the shaping of the collected cheese grains along the side-limiting walls, while the curd is subjected to prepressing means. This assembly is characterised in that the support plate and the side-limiting walls are formed by an oblong, oblique vat without top end walls, the bottom end wall of said vat being provided with means for introducing the conveyor belt, and the conveyor belt is a continuously moving belt, and the vat has means to maintain the desired level of the whey pool, and the delivery mouth of the inlet pipe is below the adjusted level of the whey pool.

This is an especially suitable assembly allowing the undisturbed deposition of the cheese grains without entrapping air.

In a preferred embodiment the conveyor belt is provided with evenly distributed holes, and the bottom of the vat has identations at least within an area below the delivery mouth of the inlet pipe, said indentations being connected with one or more outlet openings for the liquid, said outlet openings being adjacent the bottom end wall. As a result, the whey in the whey pool flows down towards the bottom of the vat and the bottom end wall, so that the cheese grains are also dragged down towards the conveyor belt, where they collect and form a cheese body.

According to the invention the area of influence of the prepressing means extends from a level below the surface level of the whey pool to a level above said surface level. As a result the pressing of the whey is initiated while there still is a large amount of whey thus enhancing the pressing and ensuring that a sufficient amount of whey is pressed out of the cheese body before the cutting of the cheese into blocks.

Furthermore, according to the invention, there is a scraper plate for adjusting the desired thickness of the cheese body formed by the cheese grains directly in front of the prepressing means, seen in the direction of transport, resulting in a comparatively easy adjustment of the desired thickness of the cheese body.

The inventive inlet pipe, seen in the flow direction of the curd, extends upwardly and over the top edge of the bottom end wall of the vat and from there obliquely down into the vat in a direction away from the bottom end wall of the vat, and said pipe is of substantially rectangular cross-section the length of said cross-section, seen in the transverse direction of the vat, increasing in a direction towards the delivery mouth until said pipe has approximately the same width as the vat. This results in an especially undisturbed feeding of the curd to the whey pool in the vat. Simultaneously, it is ensured that the cheese grains are automatically distributed across the entire width of the conveyor belt.

Moreover, the delivery mouth of the inventive inlet pipe comprises a substantially planar chute extending downwards into the whey in the vat, said chute being provided with perforations or openings. As a result, the whey is removed through the holes while passing down the chute and flows down towards the bottom end of the vat so that the whey does not unnecessarily whirl up the cheese grains. This enables the cheese grains to collect falling like snow flakes into the whey pool forming a slope with comparatively uniform inclination down towards the conveyor belt in the direction towards the bottom end of the vat. The comparatively uniform inclination and the open chute allow a relatively easy supervision of the correct operation of the assembly and the adjustment of the yield of the pump.

In a further embodiment of the invention there are, in front of the scraper plate, horizontally displaceable rake-like means levelling the surface of the cheese body before it passes beneath the scraper plate, the outer teeth of said rake-like means being flexibly journaled, seen in the direction of displacement. Thus the cheese grains are evenly distributed across the entire width of the conveyor belt before they pass beneath the scraper plate, further ensuring that a uniform product is prepared. The outer teeth of the rake-like means are resilient in order to prevent cheese grains from being pressed up along the sides of the vat at a level above the surface of the cheese body during the reciprocating movement of the rake-like means across the conveyor belt.

In yet a further embodiment of the invention there is a suction means sucking out whey following the scraper plate, seen in the direction of movement of the cheese body, ensuring a desired control of the whey flow in a forward direction passing the scraper plate at the place in question.

BRIEF DESCRIPTION OF THE DRAWINGS

The invention is described in greater detail below and with reference to the accompanying drawings, in which.

BEST MODE FOR CARRYING OUT THE INVENTION

Figure 1:
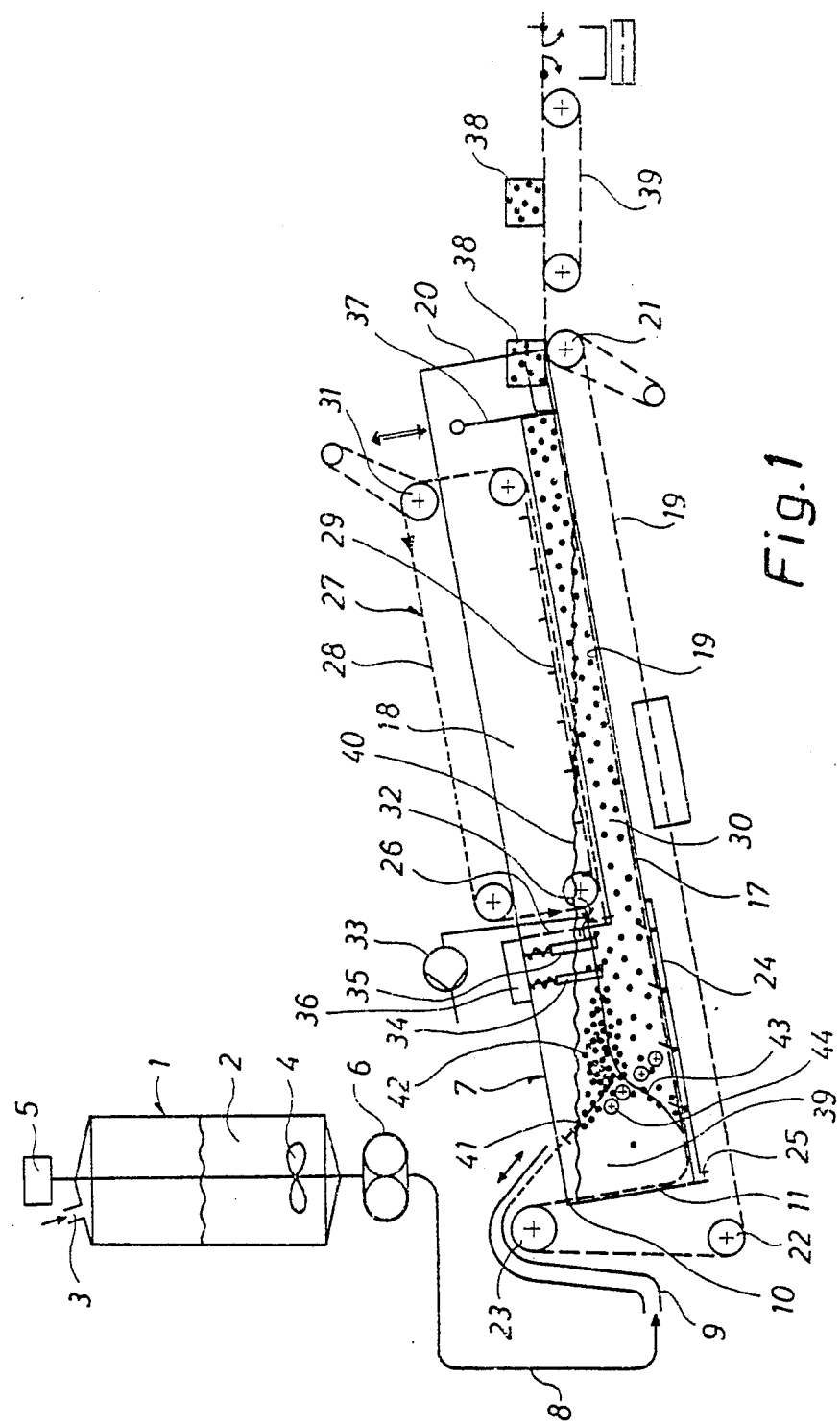
FIG. 1 is a diagrammatic side view of an assembly for carrying out the inventive method.

FIG. 1 illustrates an assembly for the preparation of prepressed curd blocks or cheese blocks comprising a storage container 1 provided for the temporary storage of a curd 2 to be supplied via an inlet 3 from a know cheese vat (not shown). Inside the storage container 1 there is a stirrer 4 driven by a motor 5. The stirrer ensures that the cheese grains remain comparatively evenly distributed in the whey until the curd 2 is fed into a vat 7 via a pump 6. The pump 6 is connected with an inlet pipe 9, shown on a larger scale in FIG. 2, via a pipe 8. The inlet pipe 9 extends upwardly and over a top edge 10 of a bottom end wall 11 of the vat 7, cf. FIG. 1. From the delivery mouth of the inlet pipe 9 to the area over the top edge 10 of the bottom end wall 11 of the vat 7 the cross-section of the inlet pipe 9 increases from a circular cross-section corresponding to the cross-section of the pipe 8 to an oblong, substantially rectangular cross-section, the length of said cross-section in the transverse direction, seen perpendicular in the drawing, increasing gradually until it has a width corresponding to the width of the vat 7.

Figure 2:
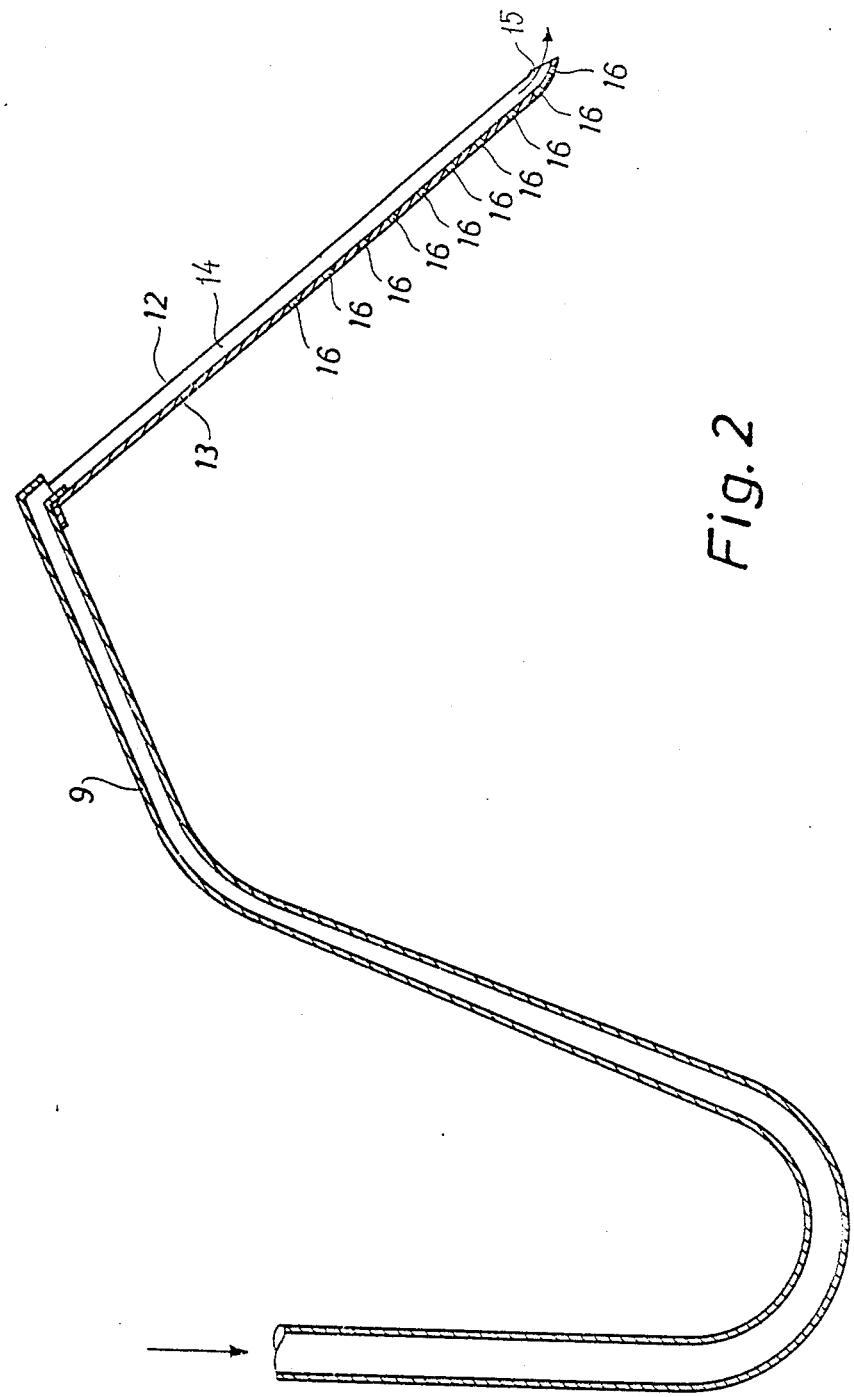
FIG. 2 illustrates on a larger scale a perpendicular, longitudinally sectional view through a part of an inlet pipe suitable for feeding curd to a vat of the inventive assembly.

As is apparent from FIG. 2, the outlet of the inlet pipe 9 has the form of a chute 12. The chute 12 has a planar bottom 13 and side walls 14, one of which is shown in FIG. 2. The chute 12 can be a separate part fastened to the inlet pipe in a manner not shown. Optionally the chute can comprise several, telescopic parts so that the length of the chute is adjustable. A section close to the outlet end 15 of the chute is provided with perforations 16 allowing the passage of whey but not of the cheese grains of the curd.

The vat 7 is oblong, obliquely arranged, and has, as mentioned before, a bottom end wall 11 but no top end wall. It is furthermore equipped with a bottom 17 and side walls 18 extending along the longitudinal direction of the vat.

Inside the vat there is a conveyor belt 19 provided with through holes in the embodiment shown. The conveyor belt is introduced at the bottom end of the vat and extending along the bottom 17 of the vat by means of control means (not shown), said bottom forming the support for the conveyor belt 19. At the top end 20 the belt 19 leaves the vat 7, passes around a driving pulley 21 and returns to the bottom end of the vat 7 via driving pulleys 22 and 23.

The bottom 17 of the vat 7 is provided with indentations or grooves 24 directly adjacent the bottom end wall 11 of the vat 7, said indentations or grooves being connected with one or more outlets 25 adjacent the end wall 11. Inside the vat there is a diagrammaticly shown scraper plate 26 perpendicular to the bottom of the vat, said plate being installed at a desired distance from the conveyor belt 19.

Next to the scraper plate 26, seen in the direction towards the top end 20 of the vat 7, there is a prepressing means 27, comprising an endless belt 28 provided with weights 29 (shown diagrammaticly) for prepressing a cheese body 30. During operation of the assembly the cheese body is conveyed towards the top end 20 of the vat 7 after having passed the gap between the scraper plate 26 and the conveyor belt 19. The prepressing means 27 is driven by a driving pulley 31 and is provided with means (not shown) to adjust the distance between itself and the conveyor belt 19.

Between the prepressing means 27 and the scraper plate 26 is an inlet 32 to a suctions means 33 sucking out liquid from the vat 7. In front of the scraper plate 26, seen in the direction towards the bottom end wall 11, two rows of teeth 34 and 35 are mounted extending, each like teeth on a rake, perpendicular down towards the bottom 17 of the vat to a desired level. The teeth of each rake 34, 35 are mounted adjacent each other in a direction transverse to the longitudinal direction of the vat 7. The height of the teeth is adjustable by means of an adjustment means 36 also acting as a means for subjecting the teeth to a reciprocating movement in the transverse direction of the vat 7. The outer teeth in each row of teeth 34, 35 are flexibly journaled to prevent cheese grains from being pressed up along the side walls 18 of the vat 7. Adjacent the top end of the vat 7 there is provided a cutting means 37 cutting off suitably dimensioned blocks from the cheese body 30 both in longitudinal and transverse direction. The blocks 38 are conveyed to a second conveyor means 39 for further, well-known processing.

During operation of the assembly the curd is fed into the vat 7 via the inlet pipe and the chute 12, said curd being automatically distributed across the entire width of the vat 7 due to the gradual increase in length of the inlet pipe 9 and the chute 12 in a direction transverse to the vat. The vat has been provided with a whey pool 39, the surface 40 of said whey pool being substantially maintained at its predetermined level during the entire operation. The inclination of the surface 40 and the vat 7 is adapted such that part of the bottom 17 adjacent to the top end 20 of the vat as well as the prepressing means are above the whey surface 40, and the mouth of the chute 12 is a short distance below said surface 40. The curd thus flows directly into the whey pool 39. Due to the holes and openings 16 in the bottom 13 of the chute 12 the conveyed whey flows directly downwards in a direction indicated by the arrow 41 towards the bottom end wall 11 of the vat 7, while the cheese grains, shown as dots by the reference numeral 42, fall slowly like snow flakes towards the conveyor belt 19. There they are deposited and form an oblique or almost S-shaped slope 43 inclining towards the bottom end wall 11 of the vat 7. The deposited cheese grains are collected in a cheese body 30 moving upwards owing to the movement of the conveyor belt 19, towards the reciprocating teeth 34 and 35 providing the cheese body with a substantially uniform thickness across the entire width of the vat 7. Subsequent to having passed the teeth 34 and 35 the cheese body passes the scraper plate 26 subjecting the cheese body 30 to a slight extrusion and giving it the desired thickness. Thereupon the prepressing is started by means of prepressing means 27, the prepressing process having been initiated while the cheese body was still immersed in the whey pool 39. During the movement of the cheese body 30 upwards towards the top end 20 of the vat 7 the prepressing is continued while the cheese body gradually emerges from the whey pool 39. During the last part of the movement of the cheese body 30 in the vat before it is conveyed to the cutting means 37 the remaining free-flowing whey dripps off. During the starting of the assembly until the desired slope 43 has been built up a hight-adjustable block (not shown) can be installed in the gap between the scraper plate 26 and the conveyor belt 19. When the desired slope inclination has been reached the conveyor belt is started and the prepressing initiated, while said block is conveyed up and removed at the cutting means 37.

The vat can be made of transparent walls for visual monitoring of the operation of the assembly. The inventive assembly may be provided with detectors, such as a photocell 44 along the backside of the chute 12, for monitoring the correct built-up of the slope 43. Other photocells (not shown) can be mounted at other locations in the vat for monitoring correct operation and desired thickness of the cheese body. Such photocells or detectors cooperate to adjust the outlet velocity of the pump 6 as well as the velocity of the whey when flowing out of the vat, such as via the outlet 25 of the suction means 33. The indentations 24 in the bottom 17 of the vat 7 constitute a further safeguard for the whey having the desired direction of flow without unnecessarily whirling up the cheese grains in the whey pool 39. The whey flows down to the outlet 25 via the indentations 24 and thus out of the vat 7.

Instead of the prepressing means comprising an endless belt, manually or mechanically installed pressing plates can be used, which are also manually or mechanically removed before they reach the cutting means 37.

The inclination of the vat furthermore ensures that a whey pool 39 can be maintained, and that possible air bubbles are easyly freed from the conveyor belt without meandering into the cheese body.

Instead of the conveyor belt passing down into the vat along the inside of bottom end wall 11 of the vat, cf. FIG. 1, the conveyor belt can be directly introduced in the bottom 17 of the vat by means of a gap in the end wall, said gap simultaneously acting as an outlet for the whey, optionally instead of the outlet 25.

The invention is described in its preferred embodiment. Many alterations may be made without thus deviating from the scope of the invention.

We claim:

1. A method for preparing prepressed cheese curd blocks which comprises:

feeding a curd which comprises a mixture of curd grains and whey to a conveyor belt below the surface of a whey pool contained within an oblong, obliquely arranged vat; and conveying said curd on said conveyor belt along an oblique path to a position above said surface of said whey pool while simultaneously during said conveying, collecting curd grains, shaping said collected curd grains by prepressing means and side-limiting walls so as to produce a resulting cheese body, and cutting said resulting cheese body into blocks.

2. A method as claimed in claim 1, wherein said curd is fed to said conveyor belt at a velocity sufficiently slow so that the curd grains are deposited below said surface of said whey pool with no further influence on their movement other than the force of gravity and the movement of said whey.

3. A method as claimed in claim 1, wherein said cheese body is conveyed on said conveyor belt below a thickness-regulating scraper plate.

4. An apparatus for preparing prepressed cheese curd blocks which comprises:
   an oblong, oblique vat defined by a bottom, side-limiting walls, an open top, and a bottom end wall provided with means for introducing a conveyor belt into said vat;
   a support plate extending along said bottom of said vat;
   an endless conveyor belt positioned within said vat;
   a pump for feeding curd comprising a mixture of curd grains and whey into said vat to said endless conveyor belt via an inlet pipe, said endless conveyor belt running along said support plate and extending from a delivery mouth of said inlet pipe to a cutting station for cutting off cheese blocks of a predetermined size from a cheese body conveyed on said endless conveyor;
   prepressing means positioned within said vat to press curd grains collected and conveyed on said endless conveyor belt; and
   means to maintain the level of the curd fed into said vat so that said delivery mouth of said inlet pipe is maintained below the surface of the curd.

5. An apparatus as claimed in claim 4, wherein said endless conveyor is provided with evenly distributed holes and the bottom of the vat has indentations at least within an area below said delivery mouth of said inlet pipe, said indentations being in fluid communication with one or more outlet openings positioned adjacent said bottom end wall.

6. An apparatus as claimed in claim 4, wherein said prepressing means extends at least from a position below the surface of the curd to a position above the surface of the curd.

7. An apparatus as claimed in claim 6, further including a scraper plate for adjusting the desired thickness of the cheese body positioned in front of said prepressing means.

8. An apparatus as claimed in claim 4, wherein said inlet pipe extends upwardly and over a top edge of said bottom end wall and obliquely down into said vat in a direction away from said bottom end wall, said inlet pipe being substantially rectangular in cross-section and increasing in cross-section towards said delivery mouth until said inlet pipe has approximately the same width as said vat.

9. An apparatus as claimed in claim 8, wherein said delivery mouth of said inlet pipe comprises a substantially planar chute extending downward into said vat, said chute being provided with perforations.

10. An apparatus as claimed in claim 4 further comprising horizontally displaceable rake means located in front of said scraper plate for leveling the surface of the cheese body before it passes beneath said scraper, said rake means including outer, flexibility journaled teeth.

11. An apparatus as claimed in claim 4 further comprising a suction means located between said prepressing means and said scraper plate for sucking whey from said vat.

* * * * *